United States Patent
Sato et al.

(10) Patent No.: US 11,941,495 B2
(45) Date of Patent: Mar. 26, 2024

(54) INFORMATION PROCESSING DEVICE, INFORMATION PROCESSING METHOD, AND RECORDING MEDIUM

(71) Applicant: NEC CORPORATION, Tokyo (JP)

(72) Inventors: Shizuka Sato, Tokyo (JP); Takazumi Kawai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1099 days.

(21) Appl. No.: 16/633,893

(22) PCT Filed: Aug. 2, 2017

(86) PCT No.: PCT/JP2017/027965
§ 371 (c)(1),
(2) Date: Jan. 24, 2020

(87) PCT Pub. No.: WO2019/026193
PCT Pub. Date: Feb. 7, 2019

(65) Prior Publication Data
US 2021/0089962 A1    Mar. 25, 2021

(51) Int. Cl.
*G06N 20/00* (2019.01)
*G06F 16/28* (2019.01)
*G06F 18/25* (2023.01)

(52) U.S. Cl.
CPC ........... *G06N 20/00* (2019.01); *G06F 16/285* (2019.01); *G06F 18/256* (2023.01)

(58) Field of Classification Search
None
See application file for complete search history.

(56) References Cited

U.S. PATENT DOCUMENTS

| | | | |
|---|---|---|---|
| 8,001,062 B1* | 8/2011 | Gargi | G06F 18/00 706/12 |
| 2010/0204967 A1* | 8/2010 | Mun | G06Q 10/04 703/2 |

FOREIGN PATENT DOCUMENTS

| | | |
|---|---|---|
| JP | 08-173417 A | 7/1996 |
| JP | 11-212947 A | 8/1999 |
| JP | 2012-181686 A | 9/2012 |
| JP | 2015-096831 A | 5/2015 |
| JP | 6076571 B1 | 2/2017 |
| WO | 2011/083687 A1 | 7/2011 |

(Continued)

OTHER PUBLICATIONS

Japanese Office Action for JP Application No. 2019-533789 dated Mar. 2, 2021 with English Translation.

(Continued)

*Primary Examiner* — Eric Nilsson
(74) *Attorney, Agent, or Firm* — Sughrue Mion, PLLC

(57) ABSTRACT

An information processing device according to the present invention includes: a memory; and at least one processor coupled to the memory. The processor performs operations. The operations includes: extracting a feature of a period or a frequency in a plurality of pieces of time-series data acquired by measuring an object; classifying the pieces of time-series data into a group related to the feature; generating, for each of the groups, a model that represents a relationship among the pieces of time-series data classified into the group; and selecting the model in which strength of the relationship satisfies a predetermined condition.

7 Claims, 9 Drawing Sheets

(56) References Cited

FOREIGN PATENT DOCUMENTS

WO      2015/145500 A1    10/2015
WO      2016/136198 A1     9/2016

OTHER PUBLICATIONS

Qiusheng Zhang et al., "Multirate sampling adaptive control and its application to thermal mixing systems", International Journal of Control, Taylor & Francis, Jan. 18, 2007, pp. 735-744, vol. 47, Issue 3.
International Search Report of PCT/JP2017/027965 dated Oct. 31, 2017 [PCT/ISA/210].
Written Opinion of PCT/JP2017/027965 dated Oct. 31, 2017 [PCT/ISA/237].

\* cited by examiner

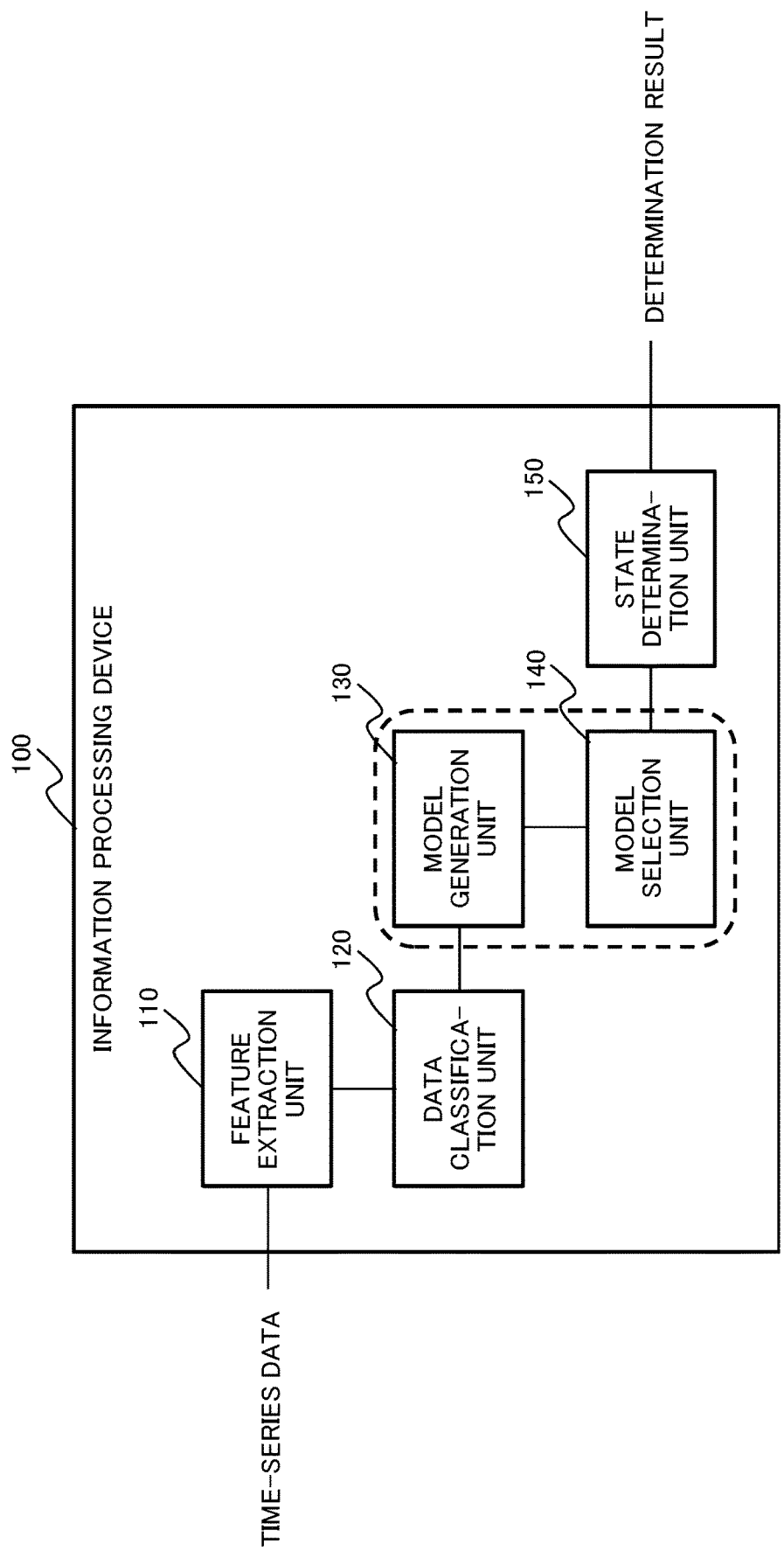

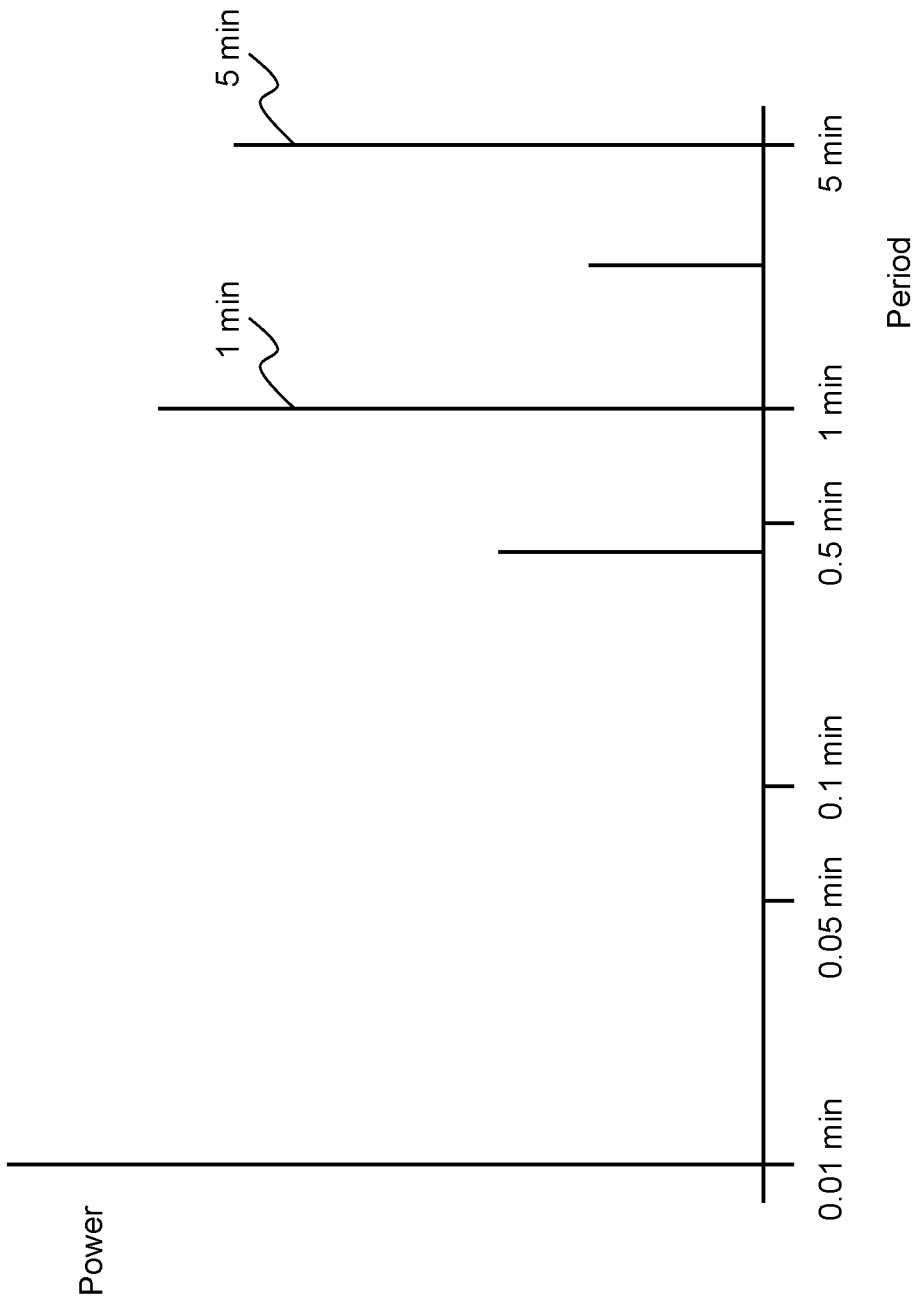

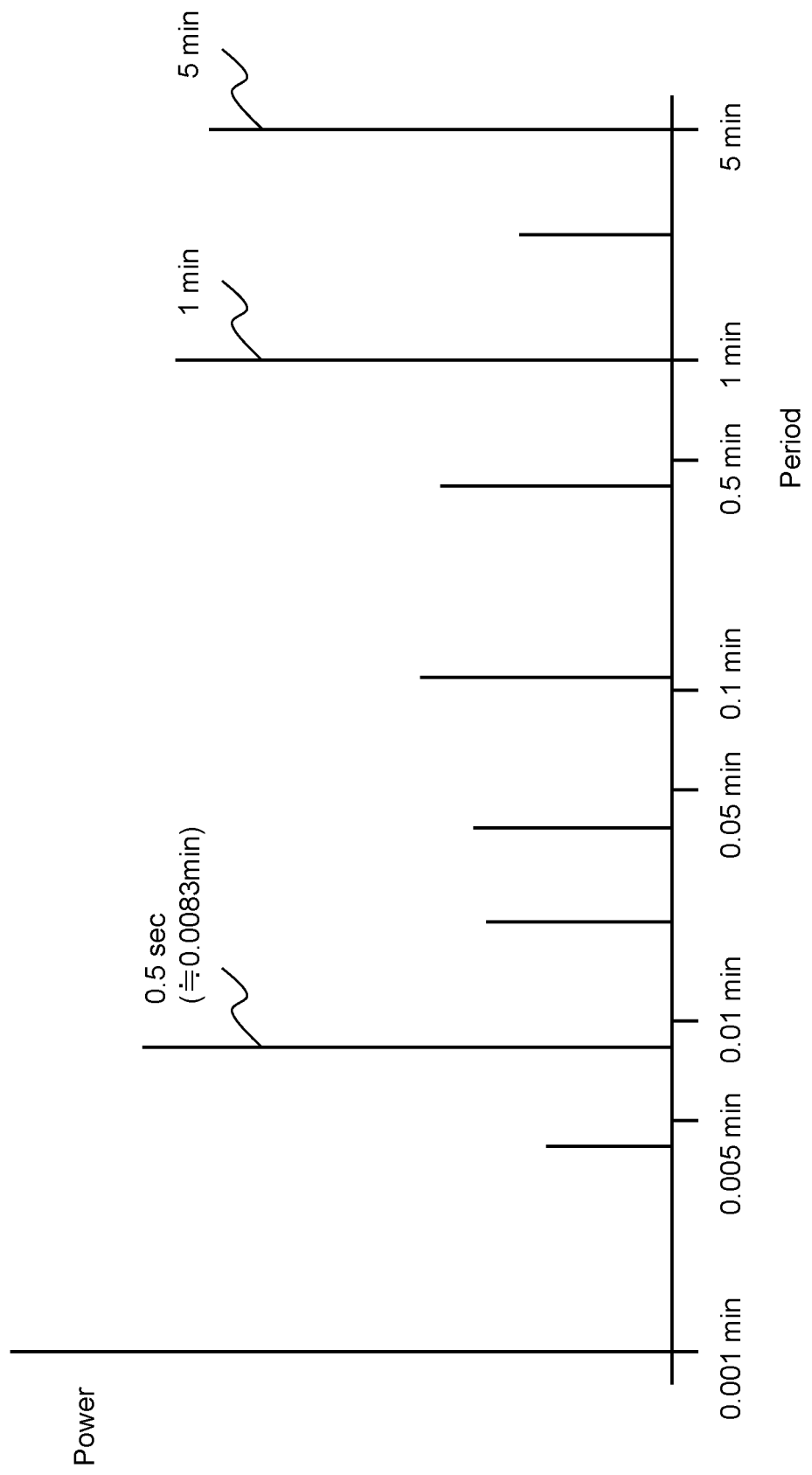

Fig. 4

| SENSOR | | GROUP INTO WHICH TIME-SERIES DATA CAN BE CLASSIFIED | | |
|---|---|---|---|---|
| SENSOR NAME | PERIOD | 5 MINUTES | 1 MINUTE | 0.5 SECONDS |
| A | 5 MINUTES | ◎ | × | × |
| B | 5 MINUTES | ◎ | × | × |
| C | 1 MINUTE | ○ | ◎ | × |
| D | 1 MINUTE | ○ | ◎ | × |
| E | 0.5 SECONDS | ○ | ○ | ◎ |
| F | 0.5 SECONDS | ○ | ○ | ◎ |
| ⋮ | ⋮ | ⋮ | ⋮ | ⋮ |

Fig. 5

CORRELATION MODEL THAT CAN BE GENERATED

| SET OF SENSORS | MODEL OF 5 MINUTES | MODEL OF 1 MINUTE | MODEL OF 0.5 SECONDS |
|---|---|---|---|
| A−B | ○ | × | × |
| C−D | ○ | ○ | × |
| E−F | ○ | ○ | ○ |
| A−C | ○ | × | × |
| A−E | ○ | × | × |
| C−E | ○ | ○ | × |
| ⋮ | ⋮ | ⋮ | ⋮ |

○ : MODEL THAT CAN BE GENERATED
× : MODEL THAT CANNOT BE GENERATED

INFORMATION PROCESSING DEVICE, INFORMATION PROCESSING METHOD, AND RECORDING MEDIUM

CROSS REFERENCE TO RELATED APPLICATIONS

This application is a National Stage of International Application No. PCT/JP2017/027965, filed Aug. 2, 2017.

TECHNICAL FIELD

The present invention relates to information processing, and in particular to an information processing device and the like that process time-series data.

BACKGROUND ART

A system such as an industrial manufacturing plant (e.g., a concrete factory or a chemical plant) is provided with various detectors for detecting an anomaly and/or diagnosing a fault.

Various methods are used as a method of analyzing data from a detector. One of the analysis methods is a method of using time-series data being data of temporal changes in an object (e.g., see Patent Literatures (PTLs) 1 to 3).

An operation management device in PTL 1 generates or selects a model of a system, based on time-series data. A user compares data (measurement data) actually measured in the system with data (prediction data) predicted based on the model, and detects an anomaly or the like of the system.

An ultrasound diagnosis device in PTL 2 acquires a power spectrum by applying Fourier transform to time-series data, and generates an image with a maximum value of the power spectrum.

A data recording device for vehicle in PTL 3 determines a sample interval, based on a time constant of data.

Further, a determination using strength of a time-series relationship among a plurality of pieces of time-series data is performed instead of a determination using one piece of time-series data. In order to determine the strength of the time-series relationship among the plurality of pieces of time-series data, it is necessary that behavior of an object is synchronized in the plurality of pieces of time-series data. Herein, the synchronization means that periods or frequencies are the same or are in a relation of an integer ratio.

When a system being an object is a large system, related time-series data have a plurality of types (e.g., temperature, speed, and vibration). Thus, a plurality of types of detectors are used. Further, positions of the detectors may be dispersed. Then, the time-series data detected by each detector with respect to behavior of the object may become data having a different period or frequency.

Then, a technique for handling a plurality of pieces of time-series data having different periods is proposed (e.g., see Non Patent Literature (NPL) 1). The technique described in NPL 1 interpolates data in data with a long period in such a way as to be adjusted to data with the shortest period, and adjusts periods of all pieces of time-series data. A user of the time-series data may interpolate data by using NPL 1 and generate or select a model by using the interpolated time-series data.

CITATION LIST

Patent Literature

[PTL 1] International Publication No. WO 2011/083687
[PTL 2] Japanese Unexamined Patent Application Publication No. H08 (1996)-173417
[PTL 3] Japanese Unexamined Patent Application Publication No. 2012-181686

Non Patent Literature

[NPL 1] Qiusheng Zang, Masayoshi Tomizuka, "Multirate sampling adaptive control and its application to thermal mixing systems", International Journal of Control, Taylor & Francis, Volume 47, Issue 3, Jan. 18, 2007, pp. 735-744

SUMMARY OF INVENTION

Technical Problem

The method described in NPL 1 requires processing of interpolating time-series data of a sensor with a long period in order to be adjusted to the shortest period. The method described in NPL 1 has an issue of increasing a calculation amount for interpolation.

In contrast, a method of thinning out time-series data with a short period in such a way as to be adjusted to time-series data with the longest period is assumed. However, this method has an issue of losing a part of data (loss of information) in the time-series data with the short period.

The method of adjusting data to time-series data with any period between the shortest period and the longest period causes an increase in a calculation amount with respect to time-series data with a longer period than the adjusted period or loss of data with respect to time-series data with a shorter period than the adjusted period. Therefore, this method cannot solve the above-described issue.

PTLs 1 and 2 do not describe the issue regarding a difference of period as described above.

Further, PTL 3 is an invention for determining a sample period by using a time constant, and thus cannot solve the above-described issue regarding a determined period.

As described above, when a model is generated or selected by using pieces of time-series data acquired in a plurality of periods, PTLs 1 to 3 and NPL 1 have the issue of an increase in a calculation amount for interpolation or the issue that thinning of data is required (loss of information occurs).

An object of the present invention is to solve the above-described issues and propose an information processing device and the like that select a model by using all pieces of time-series data acquired in a plurality of periods without using interpolation.

Solution to Problem

An information processing device according to one aspect of the present invention includes:
a memory; and
at least one processor coupled to the memory.
The processor performs operations. The operations includes:
  for extracting a feature of a period or a frequency in a plurality of pieces of time-series data acquired by measuring an object;
  classifying the pieces of time-series data into a group related to the feature;
  generating, for each of the groups, a model that represents a relationship among the pieces of time-series data classified into the group; and selecting the model in which strength of the relationship satisfies a predetermined condition.

An information processing method according to one aspect of the present invention includes:
   extracting a feature of a period or a frequency in a plurality of pieces of time-series data acquired by measuring an object;
   classifying the pieces of time-series data into a group related to the feature;
   generating, for each of the groups, a model that represents a relationship among the pieces of time-series data classified into the group; and
   selecting the model in which strength of the relationship satisfies a predetermined condition.

A non-transitory computer-readable recording medium according to one aspect of the present invention embodies a program. The program causes a computer to perform a method. The method includes:
   extracting a feature of a period or a frequency in a plurality of pieces of time-series data acquired by measuring an object;
   classifying the pieces of time-series data into a group related to the feature;
   generating, for each of the groups, a model that represents a relationship among the pieces of time-series data classified into the group; and
   selecting the model in which strength of the relationship satisfies a predetermined condition.

An information processing system includes:
   the above-mentioned information processing device receiving the time-series data from a plurality of detectors in the object; and
   a display device that receives the state from the information processing device and displays the state.

Advantageous Effects of Invention

The present invention is able to produce an advantageous effect of selecting a model by using all pieces of time-series data acquired in a plurality of periods without using interpolation.

BRIEF DESCRIPTION OF DRAWINGS

FIG. 1 is a block diagram illustrating one example of a configuration of an information processing device according to a first example embodiment of the present invention.

FIG. 2 is a diagram illustrating one example of period data.

FIG. 3 is a diagram illustrating one example of another period data.

FIG. 4 is a diagram illustrating a classification of a group.

FIG. 5 is a diagram illustrating a model that can be generated for a set of sensors.

EXAMPLE EMBODIMENT

Figure 6:
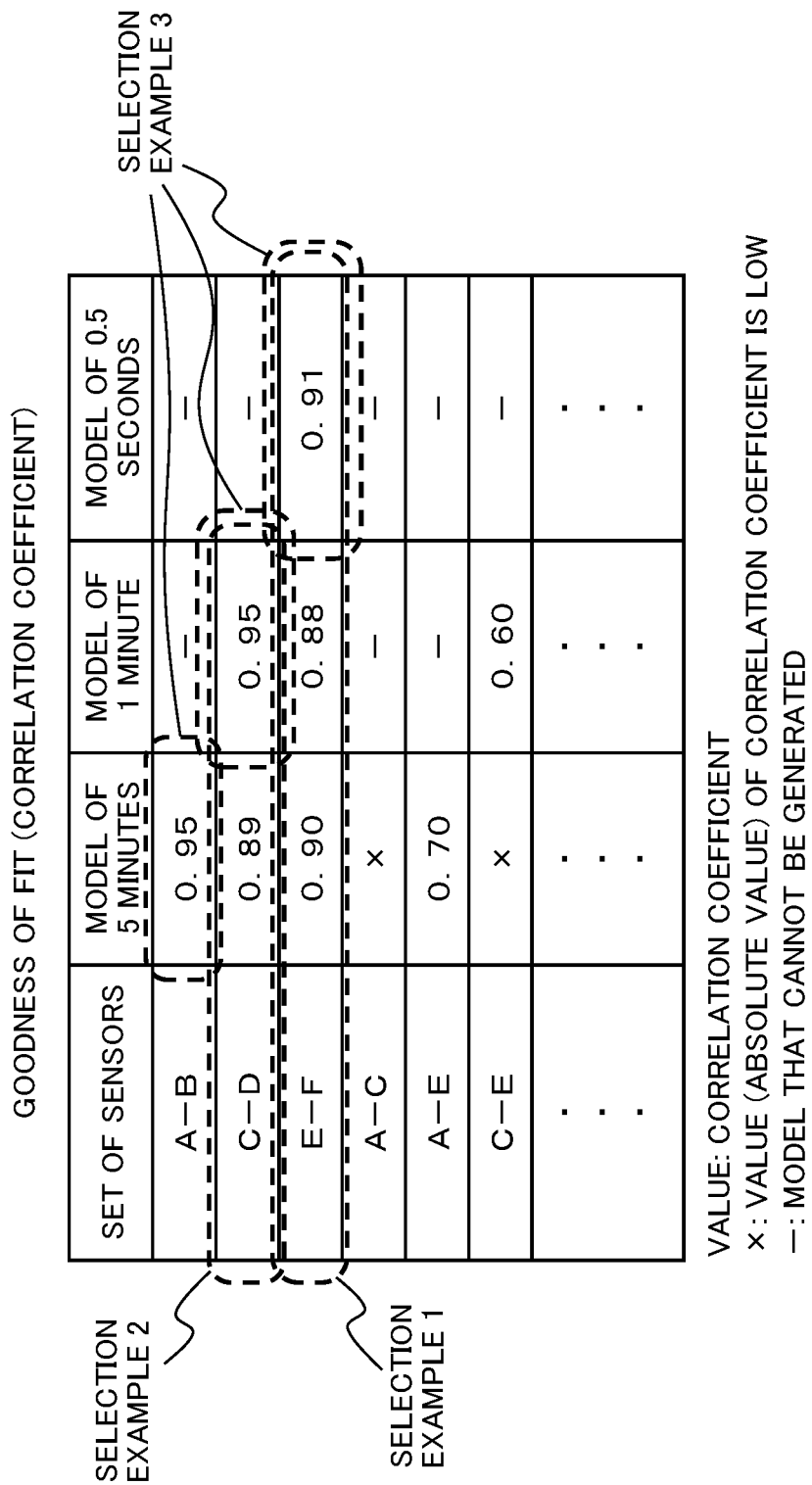
FIG. 6 is a diagram illustrating one example of selection.

Next, an example embodiment according to the present invention is described with reference to the drawings.

Note that each drawing is for illustrating the example embodiment of the present invention. However, the present invention is not limited to the description of each drawing. Further, similar configurations in each drawing are assigned with the same numbers, and thereby repeated description thereof may be omitted. Furthermore, in the drawings used for the following description, description of a configuration of a portion that does not relate to description of the present invention may be omitted and such a configuration may not be illustrated.

First Example Embodiment

First, a technique used for the description of the present example embodiment is described.

Any model associated with time-series data to be used for the example embodiment of the present invention is applicable. The model may be, for example, a model using a maximum likelihood method, a correlation model using auto regression and/or moving average, or a model using a Kalman filter. In the following description, the correlation model using auto regression is used as one example.

Further, any value representing a goodness of fit of time-series data in the correlation model is applicable. For example, the goodness of fit may be a correlation coefficient among pieces of time-series data in the correlation model. Alternatively, the goodness of fit may be, when pieces of time-series data are arranged in a predetermined space, a distance in the space. In the following description, a correlation coefficient is used as one example of the goodness of fit.

Note that the correlation model used in the following description is a correlation model related to a set of two pieces of time-series data.

Further, any machine learning used for the example embodiment of the present invention is applicable. The machine learning may be, for example, machine learning using an invariant analysis technique.

The "invariant analysis" is a technique for automatically extracting, on the basis of machine learning, a relationship among sensors, based on pieces of time-series data from the plurality of sensors. A relational expression used for the invariant analysis is generally simplified for enabling high-speed calculation. Therefore, a user can easily view the relationship among sensors comprehensively, based on the relational expression used for the invariant analysis. It is assumed that the machine learning in the following description is, as one example, machine learning using the invariant analysis.

A difference between actual measurement and prediction in the invariant analysis is also referred to as "fitness" or "prediction accuracy".

An information processing device 100 according to the first example embodiment of the present invention generates and selects a model, based on pieces of time-series data to be received continuously from a plurality of detectors (sensors) in an object. Further, the information processing device 100 determines a state of the object. However, the information processing device 100 may receive and process time-series data in real time, or may process time-series data stored in advance. In the following description, the information processing device 100 uses, as one example, time-series data received from a sensor. However, this does not limit the first example embodiment.

Further, any object of the information processing device 100 is applicable. The object may be, for example, a facility that manufactures a product such as a cement factory or a chemical plant, or a system that processes data such as a communication network.

Further, any sensor is applicable. The sensor may be, for example, a measuring instrument that measures physical quantity such as a thermometer, an accelerometer, or a flowmeter. Alternatively, the sensor may be a device that acquires a state (e.g., data amount per unit time) of logical data such as a packet monitor in a network.

Further, any determination result of a state of an object is applicable. The determination result may be, for example, a "value" such as a difference value from a target value in an object, or a "determination" such as anomaly detection when a predetermined threshold value is exceeded.

Hereinafter, the first example embodiment of the present invention is described with reference to the drawings.

[Description of Configuration]

First, a configuration of the information processing device 100 according to the first example embodiment is described with reference to the drawings.

FIG. 1 is a block diagram illustrating one example of a configuration of the information processing device 100 according to the first example embodiment of the present invention.

As illustrated in FIG. 1, the information processing device 100 receives a piece of time-series data. Then, the information processing device 100 generates and selects a model, based on an operation described below. Then, the information processing device 100 determines a state of an object by using the model. Then, the information processing device 100 transmits a determination result to a predetermined device.

The information processing device 100 includes a feature extraction unit 110, a data classification unit 120, a model generation unit 130, a model selection unit 140, and a state determination unit 150.

The feature extraction unit 110 extracts a feature for each of pieces of time-series data, based on the received pieces of time-series data.

The time-series data are time-domain data. The feature extraction unit 110 converts the time-series data being time-domain data into frequency-domain data. For example, the feature extraction unit 110 converts the time-series data into the frequency-domain data by using a fast Fourier transform (FFT) being one method of the Fourier transform.

Any format of frequency-domain data is applicable. The frequency-domain data may be, for example, data of power in a frequency. Alternatively, the frequency-domain data may be data of power in a period. In the following description, it is assumed that the frequency-domain data is, as one example, data of power in a period. Hereinafter, the frequency-domain data is referred to as "period data". In other words, the feature extraction unit 110 converts the time-series data into the period data.

Then, the feature extraction unit 110 extracts a period with maximum power in the period data. In other words, the feature extraction unit 110 extracts, as a feature, the period with maximum power.

However, the feature extraction unit 110 may extracts a frequency as a feature. In this case, the feature extraction unit 110 may convert a period into a frequency, and may generate data of power in the frequency as frequency-domain data, and extract a feature from the generated data.

FIG. 2 is a diagram illustrating one example of the period data. The vertical axis in FIG. 2 represents relative power. The horizontal axis in FIG. 2 represents a period using logarithm.

In FIG. 2, the power of the period of "1 minute" is the maximum. Then, the feature extraction unit 110 extracts the period of "1 minute" having maximum power as a feature. Hereinafter, when pieces of time-series data with the same period are referred to together, the pieces of time-series data are referred to by using such a period. For example, time-series data of which feature is the period of "1 minute" is referred to as "time-series data with a period of 1 minute".

Note that the period (or frequency) representing behavior of an object is not necessarily one. There is a case that the period data include a plurality of periods having a certain degree of power. In FIG. 2, for example, in addition to the period of "1 minute", the period of "5 minutes" has a certain degree of power.

Accordingly, the feature extraction unit 110 may extract not only one period but also a plurality of periods. For example, the feature extraction unit 110 may extract a period having a power within a predetermined range (e.g., a predetermined range of ratio with respect to maximum power) from the maximum power. Alternatively, the feature extraction unit 110 may extract a predetermined number of period from the higher power. For example, the feature extraction unit 110 may extract two periods (1 minute and 5 minutes) from the higher power in the period data illustrated in FIG. 2.

Further, the feature extraction unit 110 may change the number of period to be extracted for each of pieces of time-series data.

FIG. 3 is a diagram illustrating one example of another period data. The vertical axis and the horizontal axis in FIG. 3 are the same as those in FIG. 2. The feature extraction unit 110 may extract three periods (0.5 seconds, 1 minute, and 5 minutes) from the higher power in the period data illustrated in FIG. 3.

Note that power in the period data may be referred to as "power spectrum".

Description returns to the description with reference to FIG. 1.

The data classification unit 120 classifies the pieces of time-series data into a group, based on the feature extracted by the feature extraction unit 110.

The data classification unit 120 classifies, when the feature is a period, the pieces of time-series data into a group for each period. For example, when there are pieces of time-series data with a period of 1 minute, the data classification unit 120 classifies the pieces of time-series data into one group. Hereinafter, when a group in which pieces of time-series data with the same period are classified is referred to, the group is referred to by using such a period. For example, a group in which pieces of time-series data with a period of 1 minute are classified is referred to as a "group of a period of 1 minute".

Note that time-series data from which a plurality of periods are extracted is classified into a plurality of groups according to each period.

There is a case that time-series data include an error in measurement. In addition, there is a case that a calculation error occurs in conversion processing from time-series data into period data. Therefore, the period related to each group may include a certain degree of range. For example, a group of a period of 1 minute may include from time-series data with a period of 55 seconds to time-series data with a period of 1 minute and 5 seconds. Alternatively, the data classification unit 120 may divide a range of period to be processed into a predetermined number of groups. For example, the data classification unit 120 may classify, when the range of period to be processed is from 0.01 minutes to 10 minutes, pieces of time-series data into a group of less than 0.1 minutes, a group of 0.1 minutes or more and less than 1 minute, and a group of 1 minute or more.

Vibration phenomenon often has a component being a multiple of a basic period of the vibration. Thus, the data classification unit 120 may classify time-series data with a certain period into a group of a period being a multiple of the period. For example, the data classification unit 120 may classify the pieces of time-series data with a period of 1 minute into a group of a period (e.g., 2 minutes, 4 minutes, and/or 8 minutes) being a multiple of 1 minute. Further, provided that a multiple is an integer multiple, any multiple is applicable.

However, in any sensor, the period in which the power is not high has low possibility related to the state of the object. Thus, the data classification unit 120 may use, among multiples, a period having high power in another sensor. For example, when there is time-series data with a period of 5 minutes, the data classification unit 120 may classify the time-series data with a period of 1 minute into a group of a period of 5 minutes being 5 times of the period.

FIG. 4 is a diagram illustrating a classification of a group.

In FIG. 4, the periods on the right side of the sensor names are the periods with maximum power. In FIG. 4, a double circle represents a group related to the period with maximum power of each sensor.

Further, in FIG. 4, there are three groups: a group of a period of 5 minutes, a group of a period of 1 minute, and a group of a period of 0.5 seconds. However, the number of the group is one example. The information processing device 100 may use a group with the number less than 3 or a group with the number more than 3.

For example, with respect to time-series data of a sensor A illustrated in the first line, a period with maximum power is 5 minutes. Thus, the data classification unit 120 can classify the pieces of time-series data of the sensor A into the group of the period of 5 minutes.

With respect to time-series data of a sensor C illustrated in the third line, a period with maximum power is 1 minute. Thus, the data classification unit 120 can classify the pieces of time-series data of the sensor C into the group of the period of 1 minute. Further, the data classification unit 120 may classify the pieces of time-series data of the sensor C into a group of a period of 5 minutes being a multiple of the period of 1 minute. In FIG. 4, a circle represents a group into which time-series data can be classified. In the following description, the data classification unit 120 classifies pieces of time-series data into all groups into which time-series data can be classified. However, this is one example. The data classification unit 120 may classify pieces of time-series data into a part of the groups into which time-series data can be classified in accordance with a predetermined rule.

Description returns to the description with reference to FIG. 1.

The model generation unit 130 selects two pieces of time-series data included in each group and generates a set. Then, the model generation unit 130 generates a correlation model related to the time-series data of the set.

For example, the model generation unit 130 generates a correlation model related to a set of the pieces of time-series data classified into a group of a period of 5 minutes. For example, all sensors illustrated in FIG. 4 are classified into the group of the period of 5 minutes. Then, the model generation unit 130 generates correlation models for sets of pieces of time-series data from all sensors.

Alternatively, in FIG. 4, sensors to be classified into the group of the period of 0.5 seconds are sensors E and F. Then, the model generation unit 130 selects, as a set of pieces of time-series data in the group of the period of 0.5 seconds, a set of pieces of time-series data of the sensors E and F, and generates a correlation model related to the set.

Hereinafter, a correlation model related to a set of pieces of time-series data classified into each group is referred to by using a period of the group. For example, a correlation model related to a set of pieces of time-series data of a group of the period of 5 minutes is referred to as a "model of a period of 5 minutes" or a "model of 5 minutes".

FIG. 5 is a diagram illustrating a model that can be generated for a set of the sensors illustrated in FIG. 4.

The first line of FIG. 5 represents that a model of 5 minutes can be generated as a correlation model for a set of the sensors A and B. The third line of FIG. 5 represents that models of 5 minutes, 1 minute, and 0.5 seconds can be generated as correlation models for a set of the sensors E and F. The model generation unit 130 generates a model that can be generated.

Description returns to the description with reference to FIG. 1.

The model selection unit 140 selects a model, based on a goodness of fit of time-series data in the generated correlation model. More specifically, the model selection unit 140 selects a correlation model, based on a correlation coefficient of time-series data in each correlation model.

For example, the model selection unit 140 may select a correlation model having an absolute value of the correlation coefficient larger than a threshold value, in all groups. Alternatively, the model selection unit 140 may select a correlation model having the absolute value of the correlation coefficient larger than the threshold value, in groups more than a predetermined number. Note that the model selection unit 140 may use a positive correlation coefficient instead of the absolute value of the correlation coefficient. For example, the model selection unit 140 may select a correlation model having the correlation coefficient being a positive value larger than the threshold value.

FIG. 6 is a diagram illustrating one example of selection. A value illustrated in FIG. 6 is one example of the correlation coefficient of each model in FIG. 5.

Note that FIG. 6 indicates a positive value as one example. Further, FIG. 6 illustrates, when the absolute value of the correlation coefficient is smaller than a predetermined value, the value using "x". For example, the absolute value of the correlation coefficient of the set of the sensors A and C is smaller and thus "x" is illustrated.

For example, it is assumed that the threshold value is "0.8". In this case, with reference to FIG. 6, the correlation coefficients of the set of the sensors E and F are larger than the threshold value in all models (5 minutes, 1 minute, and 0.5 seconds). Then, the model selection unit 140 selects a correlation model related to the set of the sensors E and F (selection example 1 of FIG. 6). In this case, the model selection unit 140 selects three correlation models (model of 5 minutes, model of 1 minute, and model of 0.5 seconds).

However, the selection by the model selection unit 140 is not limited to the above.

For example, the model selection unit 140 may select the correlation model of the sensors C and D in which the correlation coefficients exceed the threshold value (0.8) in two groups (selection example 2 of FIG. 6).

Alternatively, the model selection unit 140 may select a correlation model having a maximum correlation coefficient in each model (in FIG. 6, model of 5 minutes, model of 1 minute, and model of 0.5 seconds). In case of FIG. 6, the model selection unit 140 selects the correlation models related with the set of the sensors A and B in the model of 5 minutes, the set of the sensors C and D in the model of 1 minute, and the set of the sensors E and F in the model of 0.5 seconds (selection example 3 of FIG. 6).

Description returns to the description with reference to FIG. 1.

The model generation unit 130 and the model selection unit 140 may use machine learning for generating and selecting a correlation model. The model generation unit 130 and the model selection unit 140 perform, when using machine learning, repetitive processing. Therefore, in FIG. 1, the model generation unit 130 and the model selection unit 140 are enclosed with a broken line in order to indicate the repetitive processing.

The model selection unit 140 selects, when using the invariant analysis, a model having a small difference between data (hereinafter referred to as "prediction data") acquired from the generated model and time-series data. A correlation model with a small difference is a correlation model with high prediction accuracy. Note that, in the case of the invariant analysis, the difference is referred to as fitness or prediction accuracy.

One example of the invariant analysis is described. The invariant analysis generates a prediction equation for each of pieces of time-series data. One example of the prediction equation is the following [Equation 1].

$$\hat{y}(t) = f(y,u) - a_1 y(t-1) + \ldots a_N y(t-N) + b_0 u(t-K) + \ldots + b_M u(t-K-M) + c$$ [Equation 1]

Since [Equation 1] is related to a set of pieces of time-series data, it is an equation of two variables (in the case of the invariant analysis, the variable is referred to as "metric"). In [Equation 1], the function y(t) is a function indicating an objective metric related to a piece of time-series data to be predicted at time t. The function u(t) is a function indicating a metric (non-objective metric) related to another piece of time-series data at time t. The function $\hat{y}(t)$ is a function of a prediction value of the objective metric. [Equation 1] is a prediction equation that acquires a prediction value at time t. f(y,u) indicates that Equation 1 is a function of the two metrics (y,u).

N, K, and M are constants to be set in advance. $a_1$ to $a_N$ are coefficients of the objective metric. $b_0$ to $b_M$ are coefficients of the non-objective metric. c is a constant.

In [Equation 1], the prediction value of the objective metric is generated by using a past value of the objective metric. Thus, [Equation 1] is an auto regressive model of the objective metric.

The model generation unit 130 generates a model in which the coefficients (a,b) and the constant (c) are changed in a predetermined order. Then, the model selection unit 140 selects the model when the model satisfies a constraint and fitness in the model satisfies a predetermined condition. When the model does not satisfy the constraint or the fitness in the model does not satisfy the predetermined condition, the model generation unit 130 further generates a model. The information processing device 100 repeats the above-described operation until the model selection unit 140 selects a model.

The information processing device 100 may use not only the invariant analysis but also other machine learning. Alternatively, the information processing device 100 may generate an optimization problem including a predetermined prediction equation and a constraint for a set of pieces of time-series data, and acquire a model by using a solution method related to the optimization problem.

The state determination unit 150 generates data for determination (hereinafter referred to as "determination data") by applying time-series data to the selected correlation model. Then, the state determination unit 150 compares the determination data with the received time-series data, and determines a state of the object.

Note that, when the model generation unit 130 and the model selection unit 140 generate data equivalent to the determination data in machine learning, the state determination unit 150 may use the data. For example, when a prediction range in the invariant analysis and a determination range are the same, the prediction data in the selected model is the determination data.

The determination data are data calculated based on a correlation model related to a set of pieces of time-series data having a large correlation coefficient (or an absolute value of the correlation coefficient). Alternatively, the determination data are data calculated based on a correlation model in which fitness satisfies a predetermined condition. When time-series data are significantly different from the determination data, it is assumed that the correlation is broken in a set of sensors related to the time-series data. In other words, there is a possibility that anomaly or failure has occurred in the object.

Alternatively, when a difference between the time-series data and the determination data is increasing with time, there is a possibility that the deterioration in a portion related to the sensor is progressing in the object.

The state determination unit 150 determines the state of the object by using a determination criteria based on the above-described knowledge, determination data, and time-series data.

When the model selection unit 140 selects a plurality of correlation models, the state determination unit 150 may store, in advance, the determination criteria for time-series data related to each correlation model as described above. However, the state determination unit 150 may store a predetermined priority in advance, and select and determine a correlation model, based on the priority. Alternatively, the state determination unit 150 may integrate differences between the pieces of determination data by using a plurality of correlation models and the time-series data and determine the correlation model, by using a weight to be stored in advance.

Then, the state determination unit 150 outputs a determination result to a predetermined device or the like.

[Description of Operation]

Next, with reference to the drawing, an operation of the information processing device 100 is described.

Figure 7:
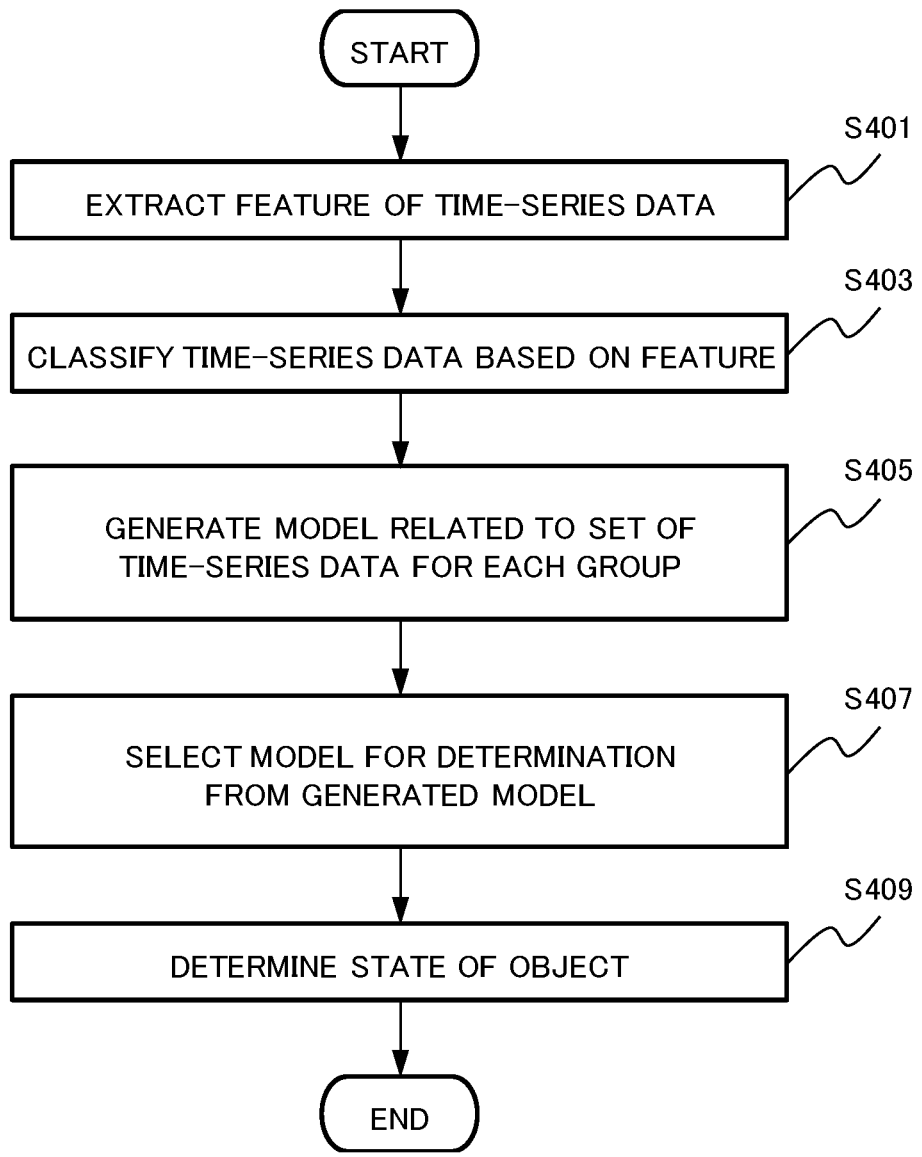
FIG. 7 is a flowchart illustrating one example of an operation of the information processing device according to the first example embodiment.

FIG. 7 is a flowchart illustrating one example of the operation of the information processing device 100 according to the first example embodiment.

The feature extraction unit 110 extracts a feature in a period (or a frequency) in a plurality of pieces of time-series data acquired from an object (step S401).

The data classification unit 120 classifies, based on the feature, the pieces of time-series data into a group (step S403).

The model generation unit 130 generates a model related to a set of the pieces of time-series data for each group (step S405).

The model selection unit 140 selects a model, based on a goodness of fit of a set of the pieces of time-series data in the generated models (step S407).

The state determination unit 150 determines a state of the object, based on determination data calculated by applying the time-series data to the selected model and the time-series data (step S409).

[Description of an Advantageous Effect]

As described above, the information processing device 100 according to the first example embodiment is able to produce an advantageous effect of selecting a model by using all pieces of time-series data acquired in a plurality of periods without using interpolation.

The reason is as follows.

The information processing device 100 includes the feature extraction unit 110, the data classification unit 120, the model generation unit 130, and the model selection unit 140. The feature extraction unit 110 extracts a feature of a period or a frequency in a plurality of pieces of time-series data acquired by measuring an object. Then, the data classification unit 120 classifies the pieces of time-series data into a group related to the feature. Then, the model generation unit 130 generates, for each group, a model representing a relationship among the pieces of time-series data classified into the group. Then, the model selection unit 140 selects a model in which strength of the relationship satisfies a predetermined condition.

In this way, the information processing device 100 classifies pieces of time-series data into a group having a period with high power in each of pieces of time-series data. The time-series data included in each group has (synchronizes) the same period or period with an integer ratio. In other words, the information processing device 100 can process time-series data of each group.

In the operation described above, the information processing device 100 does not require thinning and interpolation for any time-series data. As described above, the information processing device 100 generates and selects a model by using all pieces of time-series data in a plurality of periods without using interpolation. The information processing device 100 does not require interpolation. Further, the information processing device 100 does not lose information in time-series data.

Further, the information processing device 100 produces an advantageous effect of indicating a state of an object to a user or the like.

The reason is as follows.

In addition to the above-described configurations, the information processing device 100 includes the state determination unit 150. The state determination unit 150 calculates determination data related to time-series data by using the selected model, determines a state of an object, based on the determination data and the time-series data, and outputs a determined result.

A user of the information processing device 100 can determine the state of the object by using the output result. As described above, the information processing device 100 achieves an advantageous effect of indicating a state of an object to a user or the like.

In addition, the information processing device 100 produces an advantageous effect of achieving selection of a model related to a plurality of periods associated with time-series data.

The reason is as follows.

The information processing device 100 classifies pieces of time-series data into a group of a period having a predetermined power in period data related to the time-series data. When there are a plurality of periods having the predetermined power, the information processing device 100 classifies the pieces of time-series data into a plurality of groups. Then, the information processing device 100 uses the time-series data classified into each group for generating and selecting a model. In this way, the information processing device 100 classifies pieces of time-series data having a predetermined power in a plurality of periods into a plurality of groups, and uses the classified time-series data for generating and selecting a model.

In addition, the information processing device 100 can improve efficiency in evaluation processing.

The reason is as follows.

A period with high power is a period with large influence on an object. In contrast, a period with low power is a period with small influence. The information processing device 100 classifies pieces of time-series data into a group by using a period with high power. The pieces of time-series data included in each group are the time-series data having a period with large influence on an object. The model to be generated and selected relates to a set of the pieces of time-series data having a period with high possibility of influence. In this way, the information processing device 100 selects a set of pieces of time-series data having high possibility of influence and uses the set for generating and selecting a model, and therefore, an amount of processing for determining a state of an object can be reduced, compared with a case where all sets of the pieces of time-series data are processed.

Overview of Example Embodiment

An information processing device 101 being an overview of the first example embodiment is described with reference to the drawing.

Figure 8:
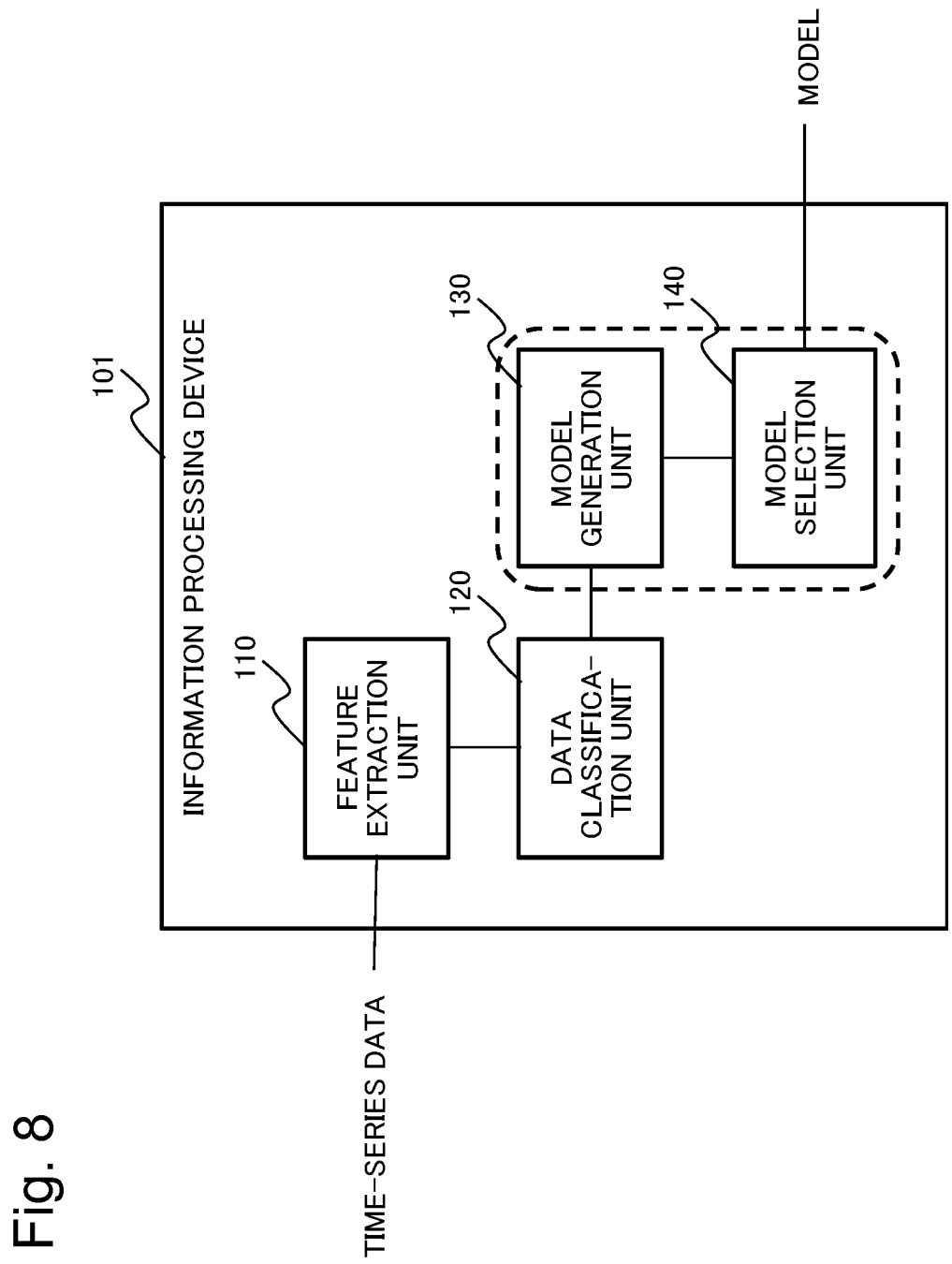
FIG. 8 is a block diagram illustrating one example of a configuration of an overview of the first example embodiment.

FIG. 8 is a block diagram illustrating one example of a configuration of the information processing device 101 being one example of the overview of the first example embodiment.

The information processing device 101 includes the feature extraction unit 110, the data classification unit 120, the model generation unit 130, and the model selection unit 140. The feature extraction unit 110 extracts a feature of a period or a frequency in a plurality of pieces of time-series data acquired by measuring an object. Then, the data classification unit 120 classifies the pieces of time-series data into a group related to the feature. Then, the model generation unit 130 generates, for each group, a model representing a relationship among the pieces of time-series data classified into the group. Then, the model selection unit 140 selects a model in which strength of the relationship satisfies a predetermined condition.

Similarly to the information processing device 100, the information processing device 101 being configured as described above produces an advantageous effect of selecting a model by using all pieces of time-series data acquired in a plurality of periods without using interpolation.

The reason is that the configurations in the information processing device 101 operate as described above and are able to select a model similarly to the information processing device 100.

Note that the information processing device 101 is a minimum configuration of the first example embodiment.

[Hardware Configuration]

Next, a hardware configuration of the information processing device 100 and the information processing device 101 is described by using the information processing device 100.

The information processing device 100 described above is configured as described below.

For example, each configuration unit of the information processing device 100 may be configured with a hardware circuit. Alternatively, in the information processing device 100, each configuration unit may be configured by using a plurality of devices connected via a network. Alternatively, in the information processing device 100, the plurality of configuration units may be configured with one piece of hardware.

Alternatively, the information processing device 100 may be achieved as a computer device including a central processing unit (CPU), a read only memory (ROM), and a random access memory (RAM). The information processing device 100 may be achieved as a computer device further including an input and output circuit (IOC) in addition to the above-described configuration. The information processing device 100 may be achieved as a computer device further including a network interface circuit (NIC) in addition to the above-described configuration.

Figure 9:
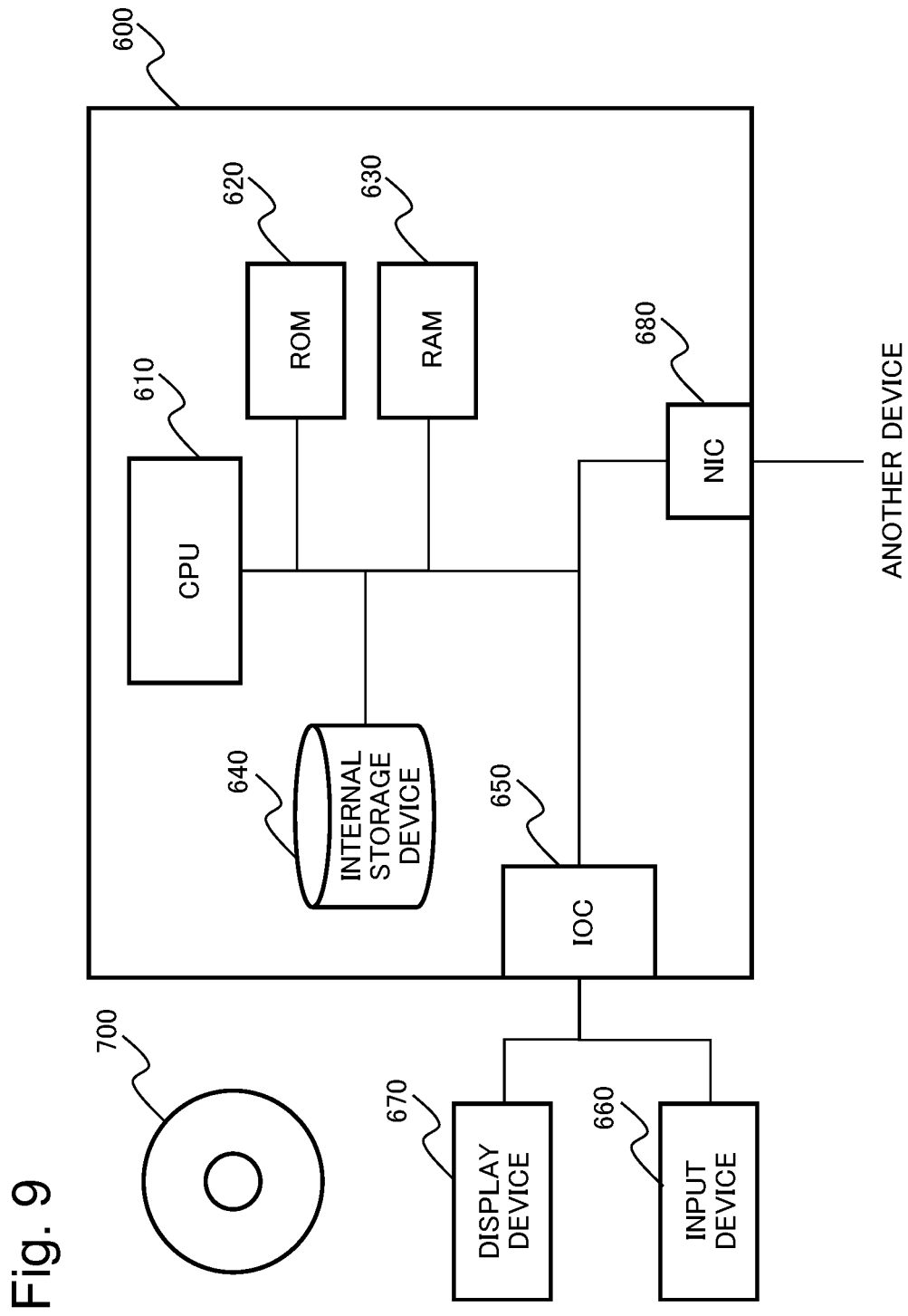
FIG. 9 is a block diagram illustrating one example of a hardware configuration of the information processing device according to the first example embodiment.

FIG. 9 is a block diagram illustrating one example of a hardware configuration of the information processing device 100 according to the first example embodiment. Specifically, FIG. 9 is a block diagram illustrating an information processing device 600 being one example of a hardware configuration of the information processing device 100.

The information processing device 600 includes a CPU 610, a ROM 620, a RAM 630, an internal storage device 640, an IOC 650, and a NIC 680, and configures a computer device.

The CPU 610 reads a program from the ROM 620. Then, the CPU 610 controls the RAM 630, the internal storage device 640, the IOC 650, and the NIC 680, based on the read program. Then, the computer including the CPU 610 controls these configurations, and each function as the feature extraction unit 110, the data classification unit 120, the model generation unit 130, the model selection unit 140, and the state determination unit 150 illustrated in FIG. 1 is achieved.

The CPU 610 may use, when achieving each function, the RAM 630 or the internal storage device 640 as a temporary storage medium for the program.

Further, the CPU 610 may read a program included in a recording medium 700 which records a readable program by a computer, by using an unillustrated recording medium reading device. Alternatively, the CPU 610 may receive a program from an unillustrated external device via the NIC 680, store the read program in the RAM 630 or the internal storage device 640, and operate based on the stored program.

The ROM 620 stores a program executed by the CPU 610 and fixed data. The ROM 620 is, for example, a programmable-ROM (P-ROM) or a flash ROM.

The RAM 630 temporarily stores a program executed by the CPU 610 and data. The RAM 630 is, for example, a dynamic-RAM (D-RAM).

The internal storage device 640 stores data and a program stored in the information processing device 600 for a long time. Further, the internal storage device 640 may operate as a temporary storage device of the CPU 610. The internal storage device 640 is, for example, a hard disk device, a magneto-optical disk device, a solid state drive (SSD), or a disk array device.

Herein, the ROM 620 and the internal storage device 640 are non-transitory recording media. In contrast, the RAM 630 is a transitory recording medium. Then, the CPU 610 can operate, based on a program stored in the ROM 620, the internal storage medium 640, or the RAM 630. In other words, the CPU 610 can operate by using a non-transitory recording medium or a transitory recording medium.

The IOC 650 mediates data between the CPU 610, and an input device 660 and a display device 670. The IOC 650 is, for example, an I/O interface card or a universal serial bus (USB) card. Further, the IOC 650 is not limited to a wired connection such as USB but may be used a wireless connection.

The input device 660 is a device that receives an input instruction from an operator of the information processing device 600. The input device 660 is, for example, a keyboard, a mouse, or a touch panel.

The display device 670 is a device that displays information to an operator of the information processing device 600. The display device 670 is, for example, a liquid crystal display.

The NIC 680 relays data transfer to an unillustrated external device via a network. The NIC 680 is, for example, a local area network (LAN) card. Further, the NIC 680 is not limited to a wired connection but may use a wireless connection.

The information processing device 600 configured in this way can produce an advantageous effect similar to the advantageous effect of the information processing device 100.

The reason is that the CPU 610 of the information processing device 600 can achieve, based on a program, a function similar to the function of the information processing device 100.

[Description of System]

Next, an information processing system 10 including the information processing device 100 according to the present example embodiment is described with reference to the drawing.

Figure 10:
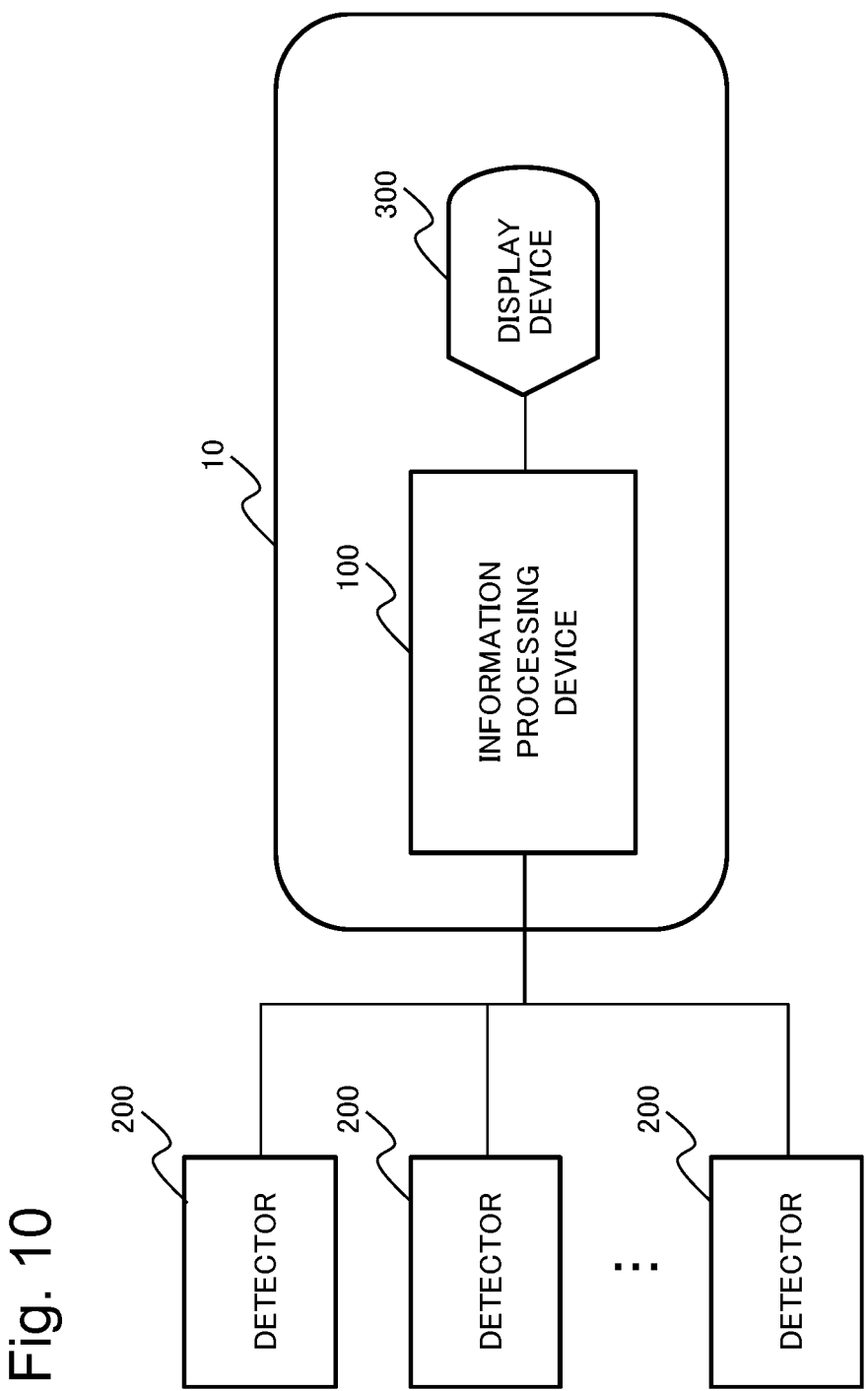
FIG. 10 is a block diagram illustrating one example of a configuration of an information processing system according to the first example embodiment of the present invention.

FIG. 10 is a diagram illustrating one example of a configuration of the information processing system 10 according to the first example embodiment of the present invention. The information processing system 10 includes the information processing device 100 according to the first example embodiment and a display device 300. The information processing device 100 is connected to a detector 200.

The detector 200 acquires time-series data with regard to a state of an object and transmits the acquired time-series data to the information processing device 100. The detector 200 may be a device that detects a state of an object directly. Alternatively, the detector 200 may be a device that collects, converts, and/or totalizes time-series data from a sensor in an object.

The information processing device 100 receives the time-series data from the detector 200 in the object. Then, the information processing device 100 transmits the state of the object to the display device 300, based on the above-described operation.

The display device 300 displays the received state of the object. For example, the display device 300 displays, when the state of the object is anomalous, anomaly of the object to a user.

The display device 300 may receive another piece of data from the information processing device 100. For example, the display device 300 may receive, in addition to the state of the object, the time-series data that is a basis of the determination, and display the time-series data according to the state of the object.

Note that the display device 300 is not limited to an external device of the information processing device 100 but may be included in the information processing device 100.

Further, at least a part of the detector 200 may be included in the information processing device 100.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention is applicable to a system that detects a state by using a correlation model. For example, the present invention is applicable to a system analysis that uses a function (universal function) being universal in determining the cause of system anomaly or failure based on the destruction of a device or the like in the system.

REFERENCE SIGNS LIST

10 Information processing system
100 Information processing device
101 Information processing device
110 Feature extraction unit
120 Data classification unit
130 Model generation unit
140 Model selection unit
150 State determination unit
200 Detector
300 Display device
600 Information processing device
610 CPU
620 ROM
630 RAM
640 Internal storage device
650 IOC
660 Input device
670 Display device
680 NIC
700 Recording medium

The invention claimed is:

1. An information processing device comprising:
a memory; and
at least one processor coupled to the memory,
the processor performing operations, the operations comprising:
receiving a plurality of pieces of time-series data being time-domain data from a plurality of sensors measuring an object, at least one sensor having a different period from a period of another sensor;
converting each of the pieces of time-series data into a piece of frequency-domain data being data of power in frequencies;
extracting a feature of a period or a frequency having maximum power in each of the pieces of frequency-domain data;
classifying each of the pieces of time-series data into one of groups, the groups respectively related to the feature for each period or frequency having maximum power;
generating a plurality of models, each of the models that represents a relationship among a plurality of the pieces of time-series data classified into each of the groups classified the pieces of time-series data; and
selecting the model in which strength of the relationship satisfies a predetermined condition.

2. The information processing device according to claim 1, wherein the operations further comprise
calculating determination data related to the time-series data by using the selected model, determining a state of the object, based on the determination data and the time-series data, and outputting a determined result.

3. The information processing device according to claim 1, wherein the operations further comprise
using a correlation coefficient in the model as the strength of the relationship, and selecting the model having an absolute value of the correlation coefficient being larger than a threshold value in all the groups or a predetermined number of the groups.

4. The information processing device according to claim 3, wherein the operations further comprise
generating, as the model, an auto regressive model that includes the correlation coefficient related to the time-series data.

5. The information processing device according to claim 1,
wherein each model of the plurality of models corresponds to a different predetermined time period value,
wherein the object is a concrete factory or a chemical plant, and
wherein the operations further comprise:
generating each model of the plurality of models based on a goodness of the time series data to a correlation model, wherein a correlation model has a correlation coefficient higher than a threshold;
selecting a model; and
generating determination data by applying the time-series data to the selected model,
wherein the selection based on maximum power corresponds to selecting a model using first time series data with more influence on the object than second time series data corresponding to the maximum power, and
wherein a significant difference between the time series data and the determination data indicates a correlation is broken with respect to a portion of the sensors related to the time series data and an anomaly has occurred in the object.

6. An information processing method comprising:
receiving a plurality of pieces of time-series data being time-domain data from a plurality of sensors measuring an object, at least one sensor having a different period from a period of another sensor;
converting each of the pieces of time-series data into a piece of frequency-domain data being data of power in frequencies;
extracting a feature of a period or a frequency having maximum power in each of the pieces of frequency-domain data;
classifying each of the pieces of time-series data into one of groups, the groups respectively related to the feature for each period or frequency having maximum power;
generating a plurality of models, each of the models that represents a relationship among a plurality of the pieces of time-series data classified into each of the groups classified the pieces of time-series data; and
selecting the model in which strength of the relationship satisfies a predetermined condition.

7. A non-transitory computer-readable recording medium embodying a program, the program causing a computer to perform a method, the method comprising:
- receiving a plurality of pieces of time-series data being time-domain data from a plurality of sensors measuring an object, at least one sensor having a different period from a period of another sensor;
- converting each of the pieces of time-series data into a piece of frequency-domain data being data of power in frequencies;
- extracting a feature of a period or a frequency having maximum power in each of the pieces of frequency-domain data;
- classifying each of the pieces of time-series data into one of groups, the groups respectively related to the feature for each period or frequency having maximum power;
- generating a plurality of models, each of the models that represents a relationship among a plurality of the pieces of time-series data classified into each of the groups classified the pieces of time-series data; and
- selecting the model in which strength of the relationship satisfies a predetermined condition.

\* \* \* \* \*